(12) United States Patent
MacGregor et al.

(10) Patent No.: US 7,234,665 B2
(45) Date of Patent: Jun. 26, 2007

(54) AIRCRAFT LANDING GEAR SNOW SKI TOW BAR

(75) Inventors: Kenneth R. MacGregor, Mesa, AZ (US); Andrew R. Zimmerle, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 164 days.

(21) Appl. No.: 10/983,920

(22) Filed: Nov. 8, 2004

(65) Prior Publication Data
US 2006/0097106 A1  May 11, 2006

(51) Int. Cl.
*B64C 25/50* (2006.01)
(52) U.S. Cl. ............................................ 244/50
(58) Field of Classification Search .............. 244/50; 280/403, 443, 493; 180/14.4, 14.6
See application file for complete search history.

(56) References Cited

U.S. PATENT DOCUMENTS

| 2,692,149 | A | * | 10/1954 | Wilcox | 280/476.1 |
|---|---|---|---|---|---|
| 2,854,251 | A | * | 9/1958 | Able et al. | 280/416.1 |
| 2,994,541 | A | * | 8/1961 | Dobbins | 280/3 |
| 3,181,893 | A | * | 5/1965 | Jopson et al. | 280/494 |
| 3,586,187 | A | * | 6/1971 | Wright | 414/428 |
| 3,895,828 | A | * | 7/1975 | Bitantis | 280/493 |
| 5,051,052 | A | * | 9/1991 | Franken et al. | 414/428 |
| 5,071,151 | A | * | 12/1991 | Irwin | 280/402 |

OTHER PUBLICATIONS

U.S. Army Aviation and Missile Command, Technical Data List, Data List No. AA1730-1251, Title: Tow Bar Universal Aircraft, drawing dated Jun. 6, 2001.

* cited by examiner

*Primary Examiner*—Tien Dinh
(74) *Attorney, Agent, or Firm*—Harness, Dickey & Pierce, P.L.C.

(57) ABSTRACT

A snow ski tow bar adapts a prior art aircraft tow bar for attachment to a landing gear of an aircraft to which a snow ski has been attached. The snow ski tow bar modifies an existing tow bar with a second set of connectors that adapt the snow ski tow bar for connection to the landing gear of the aircraft having the snow ski. In addition, the existing wheels of the prior art tow bar are replaced with a second set of wheels that are spaced outwardly from the original wheels. This positions the second set of wheels on the snow ski tow bar where they are extended outside the lateral width of the snow ski on the landing gear. The second set of wheels support the tow bar in a position above the snow ski with the second set of tow bar connectors connected to the aircraft landing gear.

14 Claims, 4 Drawing Sheets

AIRCRAFT LANDING GEAR SNOW SKI TOW BAR

FIELD

The present disclosure pertains to an aircraft snow ski tow bar. In particular, the present disclosure pertains to a prior art aircraft tow bar that has been modified to adapt the tow bar for use with aircraft to which a snow ski has been attached. The tow bar is refit with a second set of connectors that adapt the tow bar for connection to a landing gear of the aircraft having a snow ski attached. In addition, the existing wheels of the tow bar are replaced with a second set of wheels that are spaced outwardly from the original wheels. This positions the second set of wheels on the tow bar where they are extended outside the lateral width of the snow ski on the landing gear. The wheels extend downwardly on opposite sides of the snow ski and support the tow bar in a position above the snow ski with the second set of tow bar connectors connected to the aircraft landing gear. The snow ski tow bar of the present disclosure adapts an existing tow bar used on air craft without a snow ski, for use in towing the aircraft having a snow ski attached to the landing gear.

DESCRIPTION OF THE RELATED ART

Various different types of aircraft, including fixed-wing aircraft and rotary wing aircraft are used in all seasons. When used in the winter season when there is the potential for snow cover over a landing strip or landing area of the aircraft, the landing gear of the aircraft are often equipped with snow skis that support the aircraft on the surface of the snow and prevent the landing gear of the aircraft from penetrating deeply into the snow. A typical snow ski is attached to the aircraft by pivot connections that enable the snow ski to pivot about the wheel axle of the landing gear. A hole is provided through the center of the snow ski and the landing gear wheel projects downwardly through the hole. The typical snow ski has a length between a forward edge of the snow ski that projects forwardly of the landing gear wheel, and a rearward edge of the snow ski that projects rearwardly of the landing gear wheel. The snow ski also often has a lateral width that is greater than the width of the landing gear wheel, with the laterally opposite edges of the snow ski being positioned outside the lateral width of the landing gear wheel.

Tow bars are often used in moving aircraft around landing strips or landing areas. With aircraft, for example a helicopter, having three landing gear assemblies with on of the three assemblies being a trailing assembly, the tow bar is typically attached to the trailing landing gear assembly to pull the aircraft to desired positions around the landing strip or landing area.

One example of a typical tow bar is shown in FIGS. 1 and 2. The tow bar 12 has a longitudinal length with opposite proximal 14 and distal 16 ends. The distal end 16 of the tow bar is adapted for removable attachment to the aircraft trailing landing gear. The proximal end 14 of the tow bar is adapted for attachment to a motive source, for example a vehicle employed in taxiing aircraft. The tow bar typically has a pair of wheel assemblies 18 at the tow bar distal end to support the tow bar on the surface supporting the aircraft landing gear. The wheel assemblies 18 elevate the tow bar distal end 16 above the surface where a pair of connectors 22 on the tow bar distal end 16 can be easily attached to the aircraft landing gear.

However, when the aircraft is fit with snow skis, the longitudinal and lateral dimensions of the snow ski attached to the landing gear often interfere with the attachment of a tow bar to the aircraft. In order to taxi the aircraft around the landing strip of landing area, it is necessary to first remove the snow ski from the landing gear of the aircraft before attaching of the tow bar to the landing gear. When the aircraft is subsequently used in the snow covered conditions, it is necessary to reattach the snow ski to the landing gear of the aircraft after the aircraft has been taxied using the tow bar.

SUMMARY

The snow ski tow bar of the present disclosure overcomes the disadvantages associated with the use of prior art tow bars on aircraft having snow skis attached to their landing gear. The snow ski tow bar of the present disclosure adapts an existing tow bar for use with an aircraft having a snow ski attached to the aircraft landing gear.

The snow ski tow bar of the present disclosure makes use of an existing tow bar having a longitudinal length between proximal and distal ends of the tow bar. A second set of connectors is provided and attached to the tow bar distal end. The second set of connectors extend longitudinally beyond the original set of connectors of the tow bar and are positioned above the original set of connectors.

In addition to the second set of connectors, the tow bar of the disclosure is provided with a replacement set of wheel assemblies. The original set of wheel assemblies of the tow bar are removed, and the replacement set of wheels of the disclosure are attached to the tow bar adjacent the tow bar distal end.

The replacement set of wheel assemblies include arms that project laterally outwardly from the opposite sides of the tow bar. The arms project a distance outwardly from the opposite sides of the tow bar that extends beyond the lateral width of the snow ski attached to the landing gear of the aircraft.

Wheels are provided on the arms. The arms position the wheels laterally outside of the lateral width of the snow ski attached to the landing gear. In addition, the set of wheels extend downwardly below the opposite sides of the snow ski and support the tow bar distal end on the surface supporting the landing gear of the aircraft, where the tow bar distal end is positioned above the snow ski attached to the landing gear. The replacement wheels also position the second set of connectors of the tow bar in a position where they can be easily attached to the axle of the landing gear above the snow ski attached to the landing gear.

Thus, the snow ski tow bar of the present disclosure enables an existing tow bar to be adapted for use with an aircraft having a snow ski attached to the aircraft landing gear. The snow ski tow bar of the disclosure enables the tow bar to be used in taxiing the aircraft around the area of the landing strip without the need for removing the snow ski from the aircraft and later reattaching the snow ski to the aircraft.

BRIEF DESCRIPTION OF THE DRAWINGS

Further features of the disclosure are set forth in the following detailed description and in the drawing figures wherein.

DETAILED DESCRIPTION

The snow ski tow bar of the present disclosure adapts an existing prior art tow bar for use on an aircraft having snow skis attached to the aircraft landing gear. In the illustrative example to follow, the tow bar 12' of the disclosure is described as being employed with a trailing landing gear of a helicopter aircraft. It should be understood that the principles of the present disclosure may also be employed to adapt other tow bar assemblies for use in towing other types of aircraft with snow skis attached to their landing gear. For example, the tow bar 12' of the disclosure could be employed in modifying a tow bar attached to the forward landing gear of a fixed wing aircraft where a snow ski has been attached to the forward landing gear.

The snow ski tow bar 12' is a modification of the earlier described prior art tow bar 12. Many of the component parts of the snow ski tow bar 12' are the same as those of the previously described tow bar 12. Therefore, the reference numbers used in the description of the prior art tow bar 12 are also used in these common component parts found in the snow ski tow bar 12'.

Figure 1:
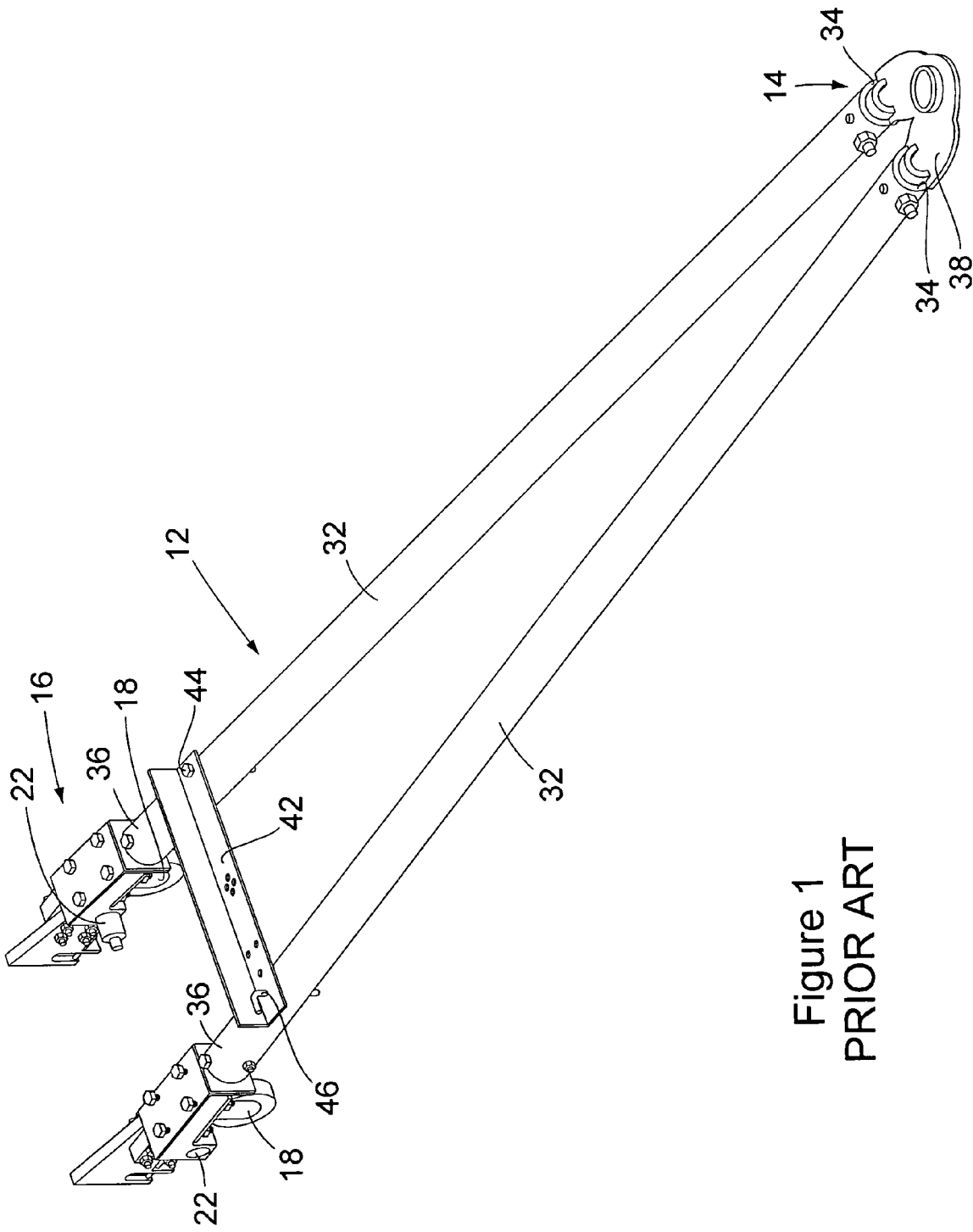
FIG. 1 is a perspective view of a prior art aircraft landing gear tow bar that is used in towing a helicopter from its trailing landing gear.
Figure 2:
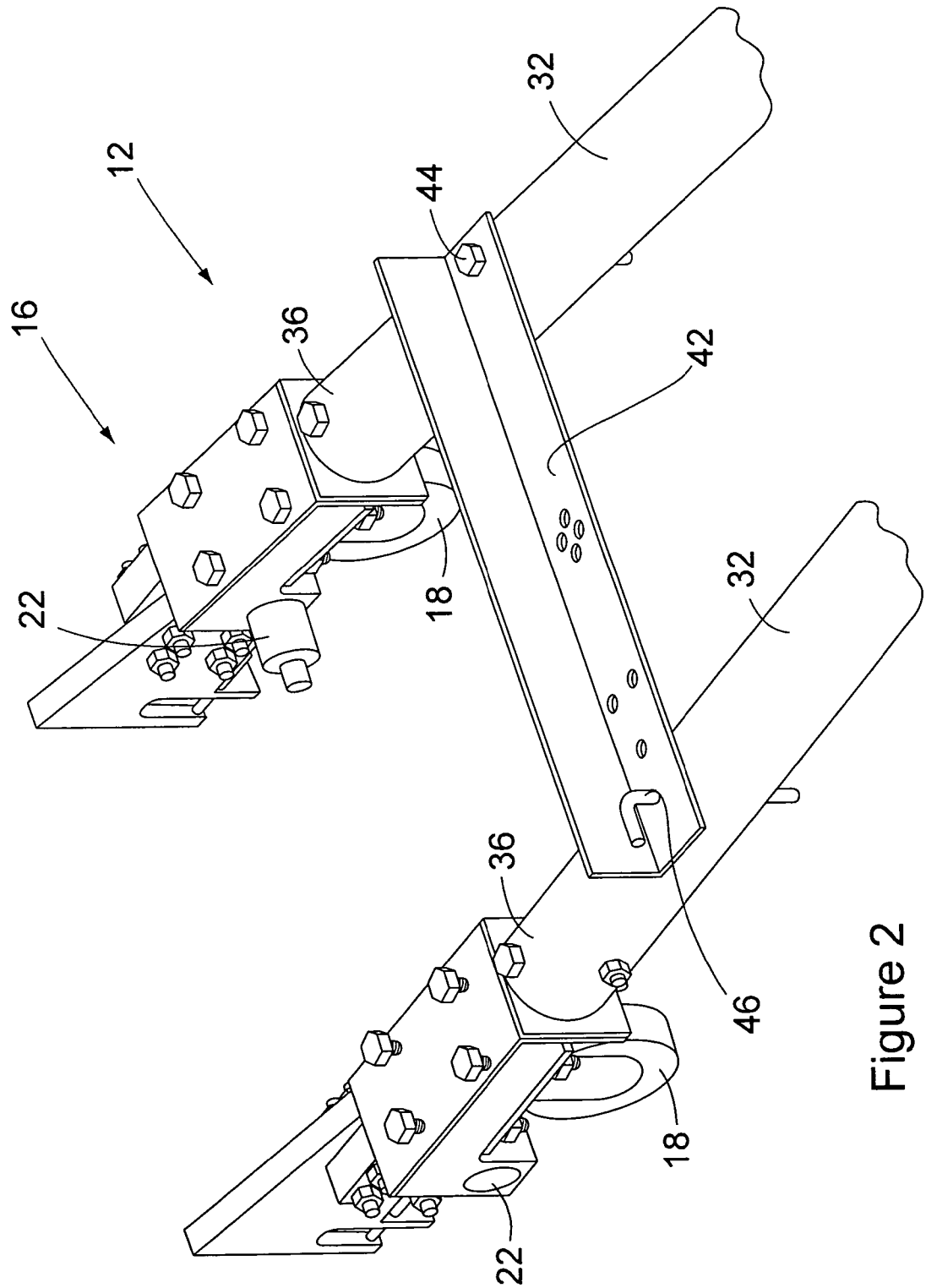
FIG. 2 is a partial view of the distal end of the tow bar of FIG. 1 showing its detail.
Figure 3:
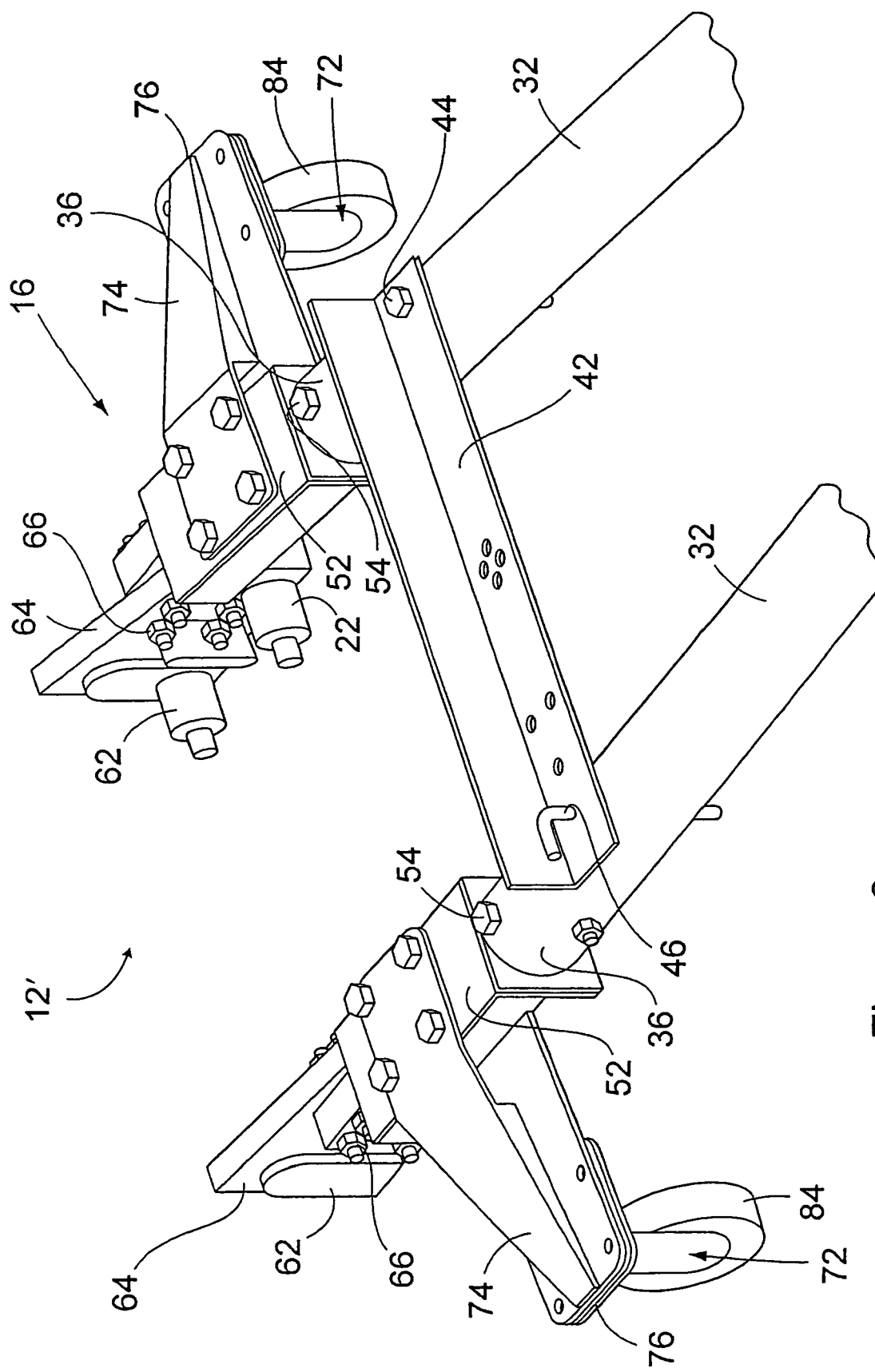
FIG. 3 is a partial view of the distal end of the snow ski tow bar of the disclosure; and, FIG. 4 is a perspective view of the snow ski tow bar of the disclosure shown connected to the trailing landing gear of a helicopter aircraft.
Figure 4:
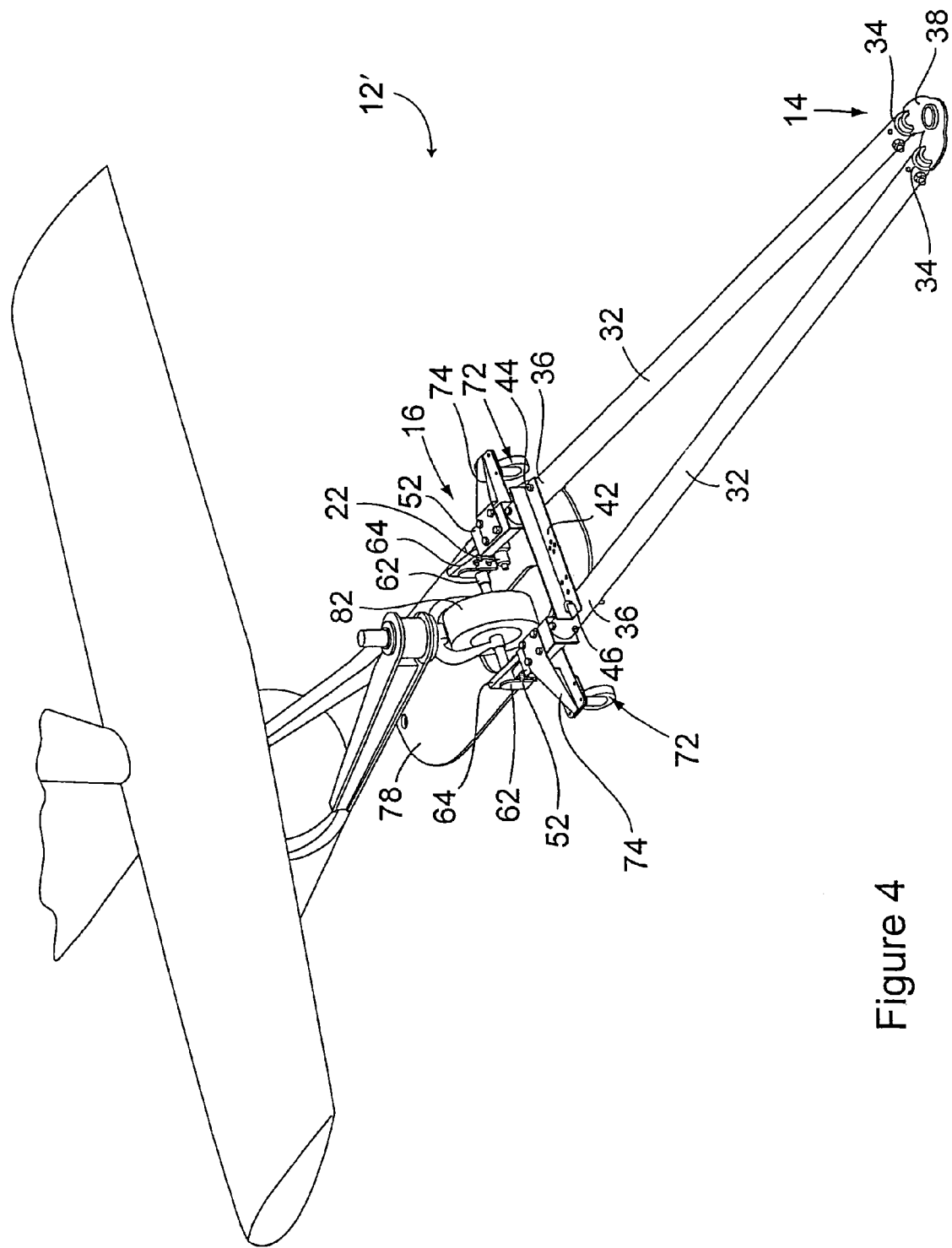

Referring to FIGS. 3 and 4, the common structural features of the prior art tow bar 12 and the snow ski tow bar 12' of the present disclosure include a pair of rods 32 having longitudinal lengths with opposite proximal 34 and distal 36 ends. The proximal ends 34 of the rods 32 are attached to a coupling member 38 that is adapted to be coupled to a separate motive source, for example a vehicle, for moving the tow bar 12' and the attached aircraft around a landing strip. A cross bar 42 is connected between the pair of rods 32 adjacent the distal ends 36 of the rods. The cross bar 42 is connected to the rods 32 by a pivot pin 44 and a removable pin 46. The removable pin 46 is inserted through aligned holes of the cross bar 42 and one of the rods 32 to allow the cross bar 42 to be pivoted relative to the other of the rods 32 in disassembling the tow bar 12'. The cross bar 42 extends laterally between the distal ends 36 of the two rods 32 and holds the rods at a desired lateral spacing between the rods that is dimensioned to allow the positioning of the aircraft wheel between the two rods.

A pair of prongs 52 are attached by threaded fasteners 54 to the rod distal ends 36. The prongs 52 are substantially the same as those of the prior art tow bar 12. The rods 32 also space the prongs 52 at a desired lateral spacing from each other to enable positioning the aircraft wheel between the prongs 52. The prongs 52 differ from the prior art prongs in that the wheel assemblies 18 of the prior art tow bar have been removed. The aircraft wheel connectors 22 of the prior art remain on the prongs 52 of the snow ski tow bar 12'. These connectors 22 provide a first set of connectors on the snow ski tow bar 12'.

A second set of connectors 62 are also attached to the pair of prongs 52. These second set of connectors 62 are positioned coaxially opposite each other at a lateral spacing that enables the second set of connectors 62 to be attached to the axle of the aircraft wheel in the same manner as the first set of connectors 22. The second set of connectors 62 are positioned at a longitudinal spacing from the first set of connectors 22, and slightly below the first set of connectors 22. The second set of connectors 62 are held in this relative position to the first set of connectors 22 by a pair of plates 64 that are attached to the distal ends of the prongs 52. The plates 64 have substantially the same configurations of the prongs 52 that enable the attachment of the first connectors 22 to the prongs. These configurations of the plates 64 enable the attachment of the second set of connectors 62 to the distal ends of the plates. As best seen in FIG. 3, the plates 64 are attached to the distal ends of the prongs 52 by a plurality of threaded fasteners, i.e. nut and bolt fasteners 66.

The snow ski tow bar 12' replaces the wheel assemblies 18 of the prior art tow bar 12 with a replacement set of wheel assemblies 72. Each of these wheel assemblies 72 comprises an outrigger or an arm 74 that is attached to the top of the one of the prongs 52. Each of the arms 74 extends laterally outwardly away from the pair of prongs 52 to distal ends 76 of the arms. The lengths of the arms 74 position the arm distal ends 76 laterally outside the snow ski 78 connected to the landing gear wheel 82 as shown in FIG. 4.

A pair of snow ski tow bar wheel assemblies 84 are attached to the undersides of each of the arm distal ends 76. The tow bar wheel assemblies 84 could include castered wheels. The lengths of the arms 74 position the wheel assemblies 84 on laterally opposite sides of the snow ski 78. The wheel assemblies 84 are positioned so that the wheel assemblies 84 and the arms 74 support the prongs 52 and the second set of connectors 62 in positions above the snow ski 78 attached to the aircraft wheel 82. In addition, the wheel assemblies 84 position the second set of connectors 62 where they can be easily attached to the aircraft wheel 82 with the snow ski 78 attached to the wheel 82 The arms 74 and the attached wheel assemblies 84 are connected to the prongs 52 by a plurality of threaded fasteners such as nut and bolt fasteners 86. These fasteners 86 enable the quick attachment of the arms 74 to the prongs 52 and the quick removal of the arms from the prongs.

The snow ski tow bar 12' enables an existing tow bar to be adapted for use with an aircraft having a snow ski attached to the aircraft landing gear. The snow ski tow bar 12' enables the tow bar to be used in moving the aircraft around the area of the landing strip without the need for removing the snow ski from the aircraft landing gear.

Although one specific embodiment has been described herein, it should be understood that modifications and variations could be made to the described embodiment without departing from the intended scope of protection provided by the following claims.

The invention claimed is:

1. An aircraft tow bar that is adapted for attachment to an aircraft wheel with a snow ski attached to landing gear structure associated with the aircraft wheel, the tow bar comprising:

a pair of prongs that are positioned relative to each other with a lateral spacing between the prongs, the lateral spacing being dimensioned to receive the aircraft wheel with its associated said snow ski in the lateral spacing between the pair of prongs;

at least one longitudinally extending rod connected to one of the pair of prongs, the rod having a proximal end that is adapted for connection to a motive source to move the rod and its said one prong;

at least one tow bar wheel connected to the prongs for supporting the prongs on a surface for movement of the prongs over the surface in response to moving the rod;

a first pair of connectors on the pair of prongs, the first pair of connectors being positioned laterally opposite each other on laterally opposite sides of the lateral spacing between the pair of prongs, the first pair of connectors being adapted for connection to the aircraft wheel on laterally opposite sides of the aircraft wheel; and a second pair of connectors on the pair of prongs, the second pair of connectors being positioned laterally opposite each other on laterally opposite sides of the lateral spacing between the pair of prongs, the second pair of connectors being adapted for connection to the aircraft wheel on laterally opposite sides of the aircraft wheel.

2. The tow bar of claim 1, further comprising:
the first pair of connectors being positioned on the pair of prongs for connection to the aircraft wheel when the snow ski is not attached to said landing gear associated with the aircraft wheel, and the second pair of connectors being positioned on the pair of prongs for connection to the aircraft wheel when the snow ski is attached to the landing gear associated with the aircraft wheel.

3. The tow bar of claim 1, further comprising:
the second pair of connectors being positioned on the pair of prongs below the first pair of connectors.

4. The tow bar of claim 3, further comprising:
the second pair of connectors being positioned on the pair of prongs where the pair of prongs are positioned above the ski when the second pair of connectors are connected to the aircraft wheel.

5. The tow bar of claim 3, further comprising:
the tow bar wheels being one of a pair of tow bar wheels connected to the pair of prongs at positions laterally opposite each other on laterally opposite sides of the lateral spacing between the pair of prongs.

6. The tow bar of claim 3, further comprising:
the tow bar wheel being one of a pair of tow bar wheels connected to the pair of prongs at positions laterally opposite each other on laterally opposite sides of the pair of prongs.

7. The tow bar of claim 3, further comprising:
the tow bar wheel being one of a pair of tow bar wheels connected to the pair of prongs at positions laterally opposite each other on laterally opposite sides of the aircraft ski.

8. The tow bar of claim 7, further comprising:
a pair of arms, each arm being connected to a prong projecting laterally outwardly from the prong away from the snow ski, and the pair of tow bar wheels being connected to the pair of arms with the pair of arms positioning the pair of tow bar wheels on laterally opposite sides of the pair of prongs.

9. An aircraft tow bar that is adapted for attachment to an aircraft wheel with a snow ski attached to the landing gear associated with the aircraft wheel, the tow bar comprising:
a pair of prongs that are positioned relative to each other with a lateral spacing between the pair of prongs, the lateral spacing being dimensioned to receive the aircraft wheel in the lateral spacing between the pair of prongs with the snow ski attached to the aircraft wheel;

a plurality of longitudinally extending rods connected to the pair of prongs and extending from the pair of prongs to proximal ends of the rods adapted for attachment to a motive source for moving the rods and thereby moving the pair of prongs;

first and second pairs of connectors on the pair of prongs for enabling removable attachment of the prongs to the aircraft wheel when the snow ski is attached to the landing gear structure of the aircraft wheel, and when the snow ski is not attached to the landing gear structure; and, at least one tow bar wheel operably associated with one of the prongs for supporting the tow bar above a ground surface.

10. The tow bar of claim 9, further comprising:
the pair of tow bar wheels being positioned on laterally opposite sides of the snow ski when the connectors are attached to the aircraft wheel with the snow ski attached to the aircraft wheel.

11. The tow bar of claim 9, further comprising:
a pair of arms on the pair of prongs, the pair of arms extending laterally outwardly from each other and from the pair of prongs; and, the pair of tow bar wheels being on the pair of arms where the pair of arms position the pair of tow bar wheels at spaced positions laterally outside the pair of prongs.

12. The tow bar of claim 11, further comprising:
the pair of tow bar wheels and the pair of arms positioning the pair of prongs over the snow ski when the connectors are attached to the aircraft wheel with the snow ski attached to the aircraft wheel.

13. The tow bar of claim 12, further comprising:
the pair of tow bar wheels being caster mounted on the pair of arms.

14. The tow bar of claim 9, further comprising:
the connectors being positioned on the pair of prongs where the pair of prongs are positioned above the snow ski when the connectors are attached to the aircraft wheel.

* * * * *